United States Patent [19]
Sawchuk

[11] 3,912,985  
[45] Oct. 14, 1975

[54] HERMETIC DEVICE ENCLOSURE
[75] Inventor: Peter Sawchuk, Corning, N.Y.
[73] Assignee: Corning Glass Works, Corning, N.Y.
[22] Filed: Mar. 4, 1974
[21] Appl. No.: 447,493

[52] U.S. Cl.............................. 317/230; 174/50.52
[51] Int. Cl.² ......................................... H01G 9/00
[58] Field of Search.................. 317/230; 174/50.52

[56] References Cited
UNITED STATES PATENTS

| | | | |
|---|---|---|---|
| 2,307,561 | 1/1943 | Bailey............................. | 317/230 X |
| 3,531,693 | 9/1970 | Buice.................................. | 317/230 |
| 3,568,009 | 3/1971 | Rappaport......................... | 317/230 |
| 3,697,823 | 10/1972 | Correll................................ | 317/230 |

Primary Examiner—Andrew J. James  
Attorney, Agent, or Firm—Walter S. Zebrowski; Clarence R. Patty, Jr.

[57] ABSTRACT

A hermetic enclosure for an electrical component, particularly for a tantalum capacitor, and a method of forming it is disclosed. A silver container is provided having an open end at which an outwardly protruding flange is formed. A tantalum cover substantially coextensive with the flange is provided having a layer of gold or gold alloy adhered to at least the sealing surface thereof. The cover is disposed adjacent the container with the gold or gold alloy adjacent the flange. A hermetic seal is affected between the container flange and the cover.

6 Claims, 2 Drawing Figures

HERMETIC DEVICE ENCLOSURE

BACKGROUND OF THE INVENTION

1. Field of the Invention

The present invention relates to the enclosing of any electrical components but in particular to electrical components having gaseous or a liquid matter which may leak or escape.

2. Description of the Prior Art

In the manufacture of wet tantalum capacitors it has been necessary to enclose a porous tantalum slug properly positioned within a metallic container by means of a plastic sleeve or cup. A substantially liquid acidic electrolyte was disposed in between the slug and the container. A substantially inert plastic element was inserted on top of the slug and the container was crimped to hold the plastic element and thereby the tantalum slug in place. On top of the plastic element, a glass to metal seal would be effected to permit one of the leads to extend beyond the enclosure. The liquid seal takes place between the plastic element and the crimped container walls and perhaps at the glass to metal seal as well. It has been found, however, that such prior art construction permits the leakage of the electrolyte after a period of time through corrosion or otherwise thereby rendering the device inoperative. Furthermore, such construction requires costly equipment and complicated assembly work.

SUMMARY OF THE INVENTION

The objects of this invention are to provide an electronic device enclosure, assembly, and method of manufacture which is economical, provides a hermetic seal for the leads and the container, and overcomes the heretofore noted disadvantages.

Broadly, according to the present invention a silver container open at one end is provided. A unitary outwardly protruding flange is formed at the open end from the container material. To a tantalum cover having an aperture therein a layer of gold or gold alloy material is adhered to at least the sealing surface thereof. The cover is substantially coextensive with the flange and is disposed over the open end of the container with the gold or gold alloy layer adjacent the flange. The flange is thereafter hermetically sealed to the cover along the flange. One of the leads is extended from the enclosed component to the exterior of the container through the aperture in the cover. Sealing glass is applied between the cover and the lead to effect a seal therebetween.

Additional objects, features, and advantages of the present invention will become apparent to those skilled in the art, from the following detailed description and the attached drawing on which, by way of example, only the preferred embodiments of this invention are illustrated.

DETAILED DESCRIPTION

Figure 1:
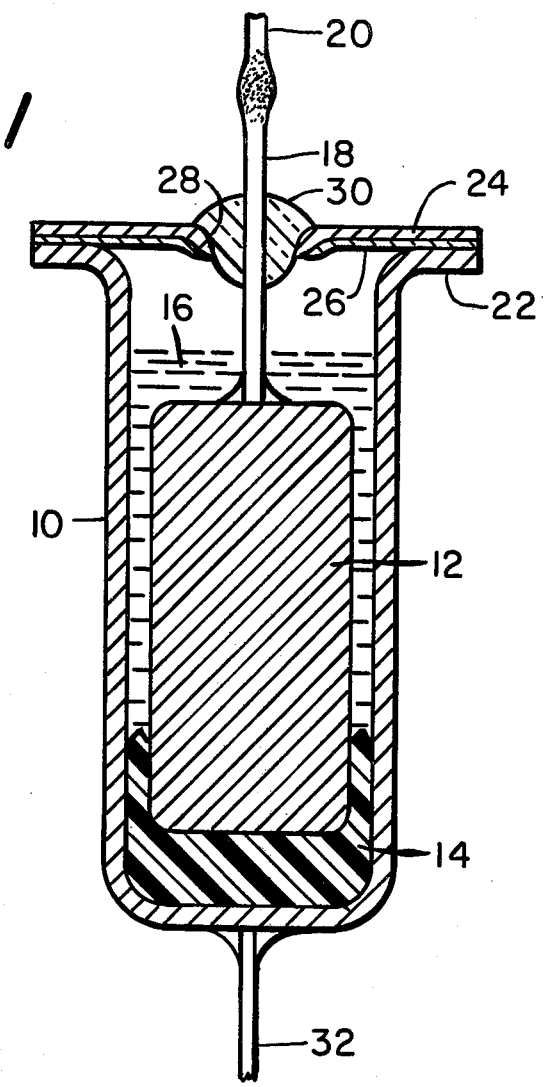
FIG. 1 is a cross-sectional view of an electronic device encapsulated in accordance with the present invention.

It is to be noted that the figures of the drawing are illustrative and symbolic of the invention, and there is no intention to indicate scale or relative proportions of the elements shown therein. For the purposes of simplicity, the present invention will be described in connection with a hermetic enclosure for a wet tantalum capacitor, however, the present invention is in no way limited to such an enclosure, rather is applicable to any enclosure for an electronic or other device.

Referring to FIG. 1, there is shown housing 10 within which a porous tantalum slug 12 is disposed. The preferred material for housing or container 10 is silver. Porous tantalum slug 12 is shown positioned within housing 10 by means of a synthetic rubber cuplike member or boot 14 formed of material electrically and chemically compatible with the various materials of the capacitor as is well known in the art. Electrolyte gel 16 is disposed within housing or container 10 totally immersing porous tantalum slug 12. A tantalum lead 18 is affixed to porous tantalum slug 12 and extends a sufficient distance outside of the container so as to permit an external lead 20 to be attached thereto. Such lead 20 may be formed of nickel, nickel alloys or other materials known in the art and is attached to tantalum lead 18 by welding or other methods known in the art. An outwardly protruding unitary flange 22 is formed of the housing material at the open end of housing 10. Tantalum cover 24 is formed with a layer 26 of gold or gold alloy applied to the sealing surface thereof. An aperture 28 is formed within cover 24 to permit tantalum lead 18 to be extended beyond the container. A quantity of dielectric sealing glass 30 is deposited within aperture 28 surrounding tantalum lead 18 so as to electrically insulate lead 18 from cover 24 and subsequently housing 10. An example of a suitable dielectric sealing glass is as follows in weight percent on an oxide basis: $SiO_2$—65%, $Al_2O_3$—7%, $B_2O_3$—10%, $Li_2O$—3%, $Na_2O$—2%, $BaO$—6%, $Fe_2O_3$—3%, and F—4%. Cover 24 is substantially coextensive with flange 22 and is disposed on flange 22 with layer 26 adjacent the flange. Cover 24 is then hermetically sealed to housing 10 at flange 22 by ultrasonic welding or the like in a manner well known in the art.

As will be readily understood, tantalum slug 12 forms one electrode of the capacitor while housing 10 forms the other electrode. Lead 32 is attached to housing 10 by any means known in the art such for example as welding or soldering.

Figure 2:
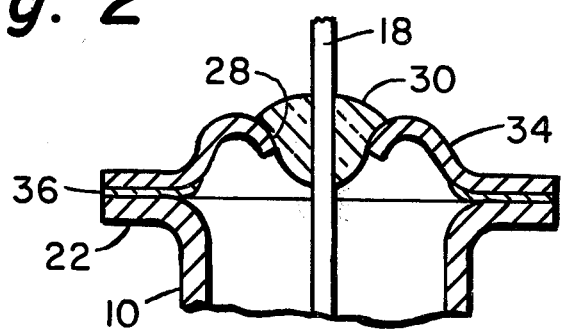
FIG. 2 is a fragmentary cross-sectional view of another embodiment of the present invention.

Referring to FIG. 2, there is shown another embodiment of the enclosure of the present invention. A domed cover 34 is formed with a layer 36 of gold or gold alloy adhered to the peripheral sealing surface of the cover. Tantalum lead 18 is attached to cover 34 by means of sealing glass 30 as heretofore described. Similarly, cover 34 is hermetically sealed to housing 10 by means of ultrasonic welding, or the like as heretofore described.

As a typical example, an enclosure is formed by first preparing a cylindrical container or housing of silver. The housing is formed closed at one end so as to have a cavity sufficiently large to receive an electrical component such as a porous tantalum slug. At the open end of the housing an outwardly protruding flange is formed. At the bottom of the housing cavity a cup-shaped member formed of Viton a fluoroelastomer rubber produced by E. I. du Pont de Nemours and Co., Inc. is disposed within which the tantalum slug will be deposited. A relatively flat cover having an aperture therein, such as cover 24 illustrated in FIG. 1, is formed of tantalum. A two mil thick gold alloy foil is disposed on one surface of the cover and is fused to the cover by heating to a temperature of about 1,065°C in an argon atmosphere or a vacuum furnace. The gold foil is formed of an alloy having by weight 75% gold, 20% copper and 5% silver.

A tantalum lead is attached to a porous tantalum slug and the lead is disposed within the aperture in the cover so as to protrude therethrough. A quantity of dielectric sealing glass such as that described heretofore is then disposed in the aperture surrounding the tantalum lead and heated so as to fuse and effect a glass to metal seal between the tantalum lead and the glass as well as the glass and the cover.

The tantalum slug with the tantalum lead attached thereto is disposed within the container and snugly fitted within the cup-shaped member in a manner so that the lead protrudes from the open end of the container. An electrolyte gel formed of a mixture of 38% sulfuric acid and an anhydrous and particulate colloidal silica material commercially known as Cab-O-Sil available from the Cabot Corp. of Boston, Mass. is disposed between the tantalum slug and the housing so as to completely cover the tantalum slug. The cover with the gold alloy foil fused thereto is thereby disposed around the protruding tantalum lead substantially coextensively with the flange so that the gold alloy surface is adjacent the flange. The cover is then ultrasonically welded to the housing about the flange.

An external lead of nickel wire is attached to the tantalum lead by electric welding while a second lead is attached to the closed end of the housing by silver soldering thereby completing the capacitor.

It has been found that enclosures formed in accordance with the present invention are hermetic and do not permit the leakage of an electrolyte gel under even the most severe circumstances.

Although the present invention has been described with respect to specific details of certain embodiments thereof it is not intended that such details be limitations upon the scope of the invention except insofar as set forth in the following claims.

I claim:
1. An enclosure comprising
   a silver container with an uncoated interior surface and open at one end, said container having a unitary outwardly protruding flange at said open end,
   a metallic cover substantially coextensive with said unitary outwardly protruding flange,
   a layer of material selected from the group consisting of gold and gold alloy hermetically adhered to at least a surface of said metallic cover, said cover disposed so that said layer of material is adjacent said unitary outwardly protruding container flange, and
   a hermetic seal between said unitary outwardly protruding container flange and the layer of material hermetically adhered to said metallic cover along said unitary outwardly protruding flange.
2. The enclosure of claim 1 wherein said cover embodies an aperture therein further comprising a lead disposed within said aperture and a quantity of sealing glass fused to said lead and the aperture defining portion of said cover.
3. The enclosure of claim 2 further comprising an electrical component disposed within said container to which said lead is electrically attached.
4. The enclosure of claim 3 wherein said component is a porous tantalum slug attached to said lead for electrical continuity.
5. The enclosure of claim 4 further comprising a lead attached to said container at the end opposite said open end.
6. The enclosure of claim 4 wherein said metallic cover is formed of tantalum.

* * * * *